(Model.)
S. W. BOWNE.
APPARATUS FOR DISSOLVING AND DIGESTING MEAT.
No. 258,359. Patented May 23, 1882.
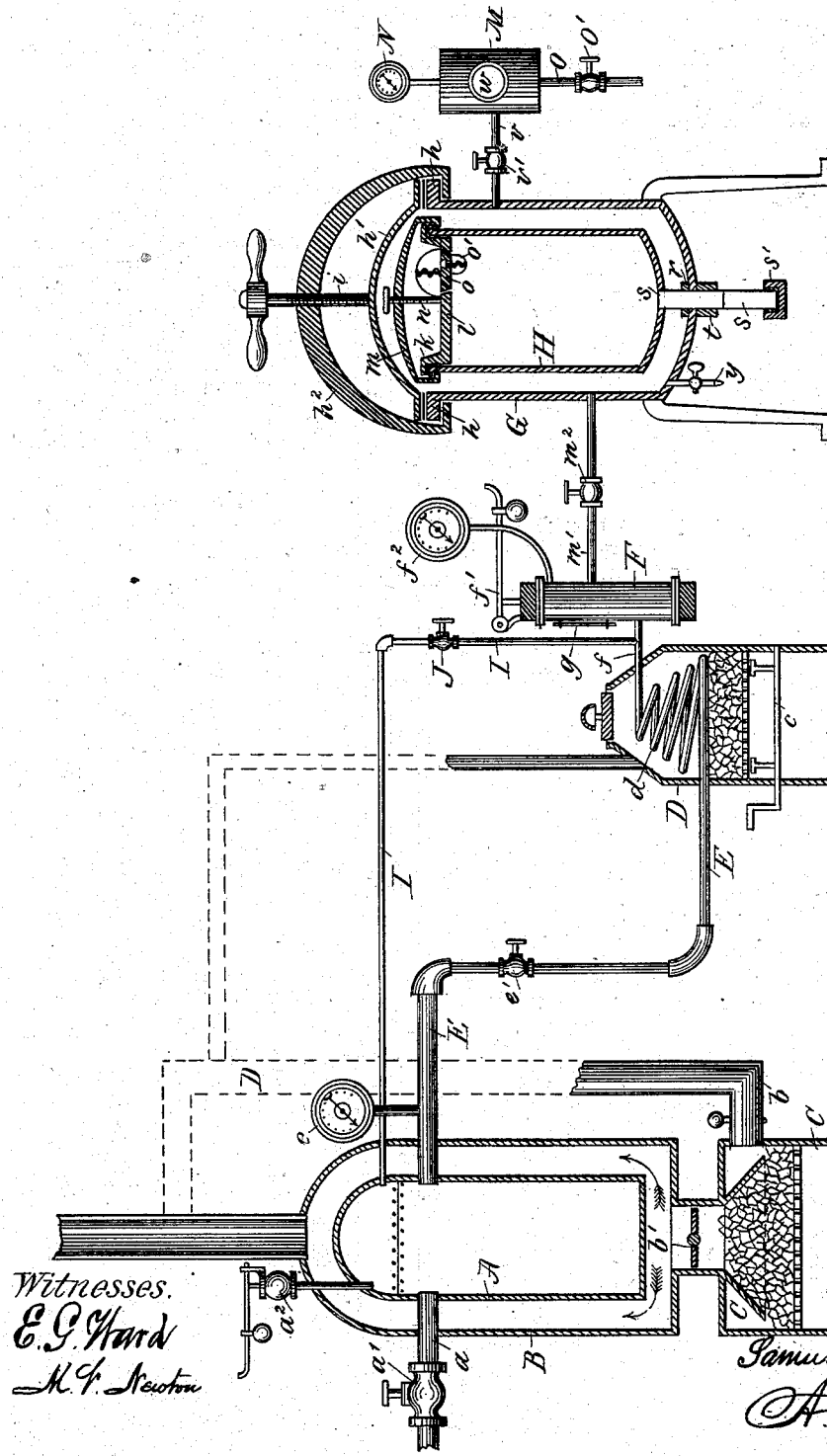
Witnesses.
E. G. Ward
M. S. Newton
Inventor
Samuel W. Bowne
A. L. Morrison
Atty.

UNITED STATES PATENT OFFICE.

SAMUEL W. BOWNE, OF NEW YORK, N. Y., ASSIGNOR TO SCOTT & BOWNE, OF SAME PLACE.

APPARATUS FOR DISSOLVING AND DIGESTING MEAT.

SPECIFICATION forming part of Letters Patent No. 258,359, dated May 23, 1882.

Application filed January 24, 1881. (Model.)

*To all whom it may concern:*

Be it known that I, SAMUEL W. BOWNE, a citizen of the United States, residing at the city of New York, in the county of New York and State of New York, have invented a new and useful Improvement in Apparatus for Dissolving Meat, of which the following is a specification.

My invention relates to the process of preparing meats or extracts of meats in a condensed form, in which condition the product is packed for consumption in jars or cans hermetically sealed.

The present invention has for its object the thorough dissolution of the soluble matter contained in meat that is of any value or use for food, and to reject only that part thereof that contains no nourishing qualities.

The apparatus employed, its application and operation, and the details of the process by means of which I attain my objects will be hereinafter fully pointed out and described.

The drawing represents a longitudinal vertical section of an apparatus in which is fully embodied the means by which my process of dissolving meat is accomplished.

In carrying out my invention I make use of superheated steam as the direct dissolving and digesting agent, applying its action upon the meat by means of the combined apparatus illustrated in the drawing. By these combined means I am enabled to absolutely extract and dissolve all of the life-giving properties contained in meat, thoroughly digesting it, and giving as a final product a gelatinous mass, in which is embodied all the nutritious elements of the meat, the residuum expunged during the process being only that part of the meat which is utterly useless for the purposes of food, and which is very objectionable when left in extracts of meats that are particularly prepared for the use of invalids. For such uses there is demanded a perfectly-dissolved and absolutely-digested extract of meat which will pass into the system of the patient without wearing upon the digestive organs and weakening his strength. This desideratum I have succeeded in accomplishing by my improved apparatus and process.

The apparatus employed for producing the superheated steam may be of any of the well-known forms; but I prefer the system as shown in the drawing of applying the same to my process. The main supply of steam may be drawn from any approved form of boiler.

The drier consists of a boiler or vessel, A, of proper strength, which is supported in an upright position in the interior of a suitable heater, B, which is provided at its base with a suitable furnace, C. This drier A receives the steam from the main boiler by means of an inlet-pipe, $a$, provided with a suitable cut-off valve, $a'$. A safety-valve, $a^2$, is also attached to the direr A and projected above the shell of the heater B. The furnace C of the heater is provided with a secondary draft flue or pipe, $b$, through which the heat may be sent when not desired to be applied to the drier A, a damper, $b'$, being provided in the flue entering the drier to cut off the heat therefrom when so desired.

D is the superheater, consisting of a furnace of approved form, and with its heating-worm or coil of pipe $d$ arranged in the usual form. This furnace is provided with a shaking-bar, $c$, by means of which the fire may be instantly dropped from the grate and superheating-coil when so desired.

The steam is drawn from the drying-chamber A by means of the pipe E, to which is applied a steam-pressure gage, $e$, a globe-valve, $e'$, also being attached thereto for the purpose of controlling the flow of steam. The steam after being superheated is taken from the superheater D by means of the pipe $f$ and inducted into the expansion-chamber F, which is provided with a safety-valve, $f'$, and pressure-gage, $f^2$. A thermometer, $g$, is also attached to the expansion-chamber for the purpose of indicating the temperature of the superheated steam.

Thus far my apparatus consists mainly of approved mechanical devices for superheating steam and the means of properly controlling it in that form.

The dissolving and digesting apparatus consists of an outer vessel, G, constructed of metal of sufficient strength to bear great pressure. Its form may be that as shown in the drawing. Still, it may be varied therefrom to suit circumstances. The top of this vessel is left open its entire diameter to permit the depositing therein of the inner vessel or digester, H. The mouth of the vessel G is provided with flange $h$, upon which the cover $h'$ rests, and is there secured by means of the yoke $h^2$ and the clamping-screw $i$. A suitable packing is interposed between the cover and top of the vessel to prevent leakages of steam.

Other means of applying and securing the cover $h'$ upon the top of vessel G, so as to resist great steam-pressure from within the vessel, will readily suggest themselves to the skilled mechanic, and I therefore do not limit myself to the form shown and described.

The inner or digesting vessel, H, is also strongly constructed, though of much lighter metal than the outer vessel. It is supported centrally inside the vessel G in any approved manner. Its mouth is also the full diameter of the vessel, and provided with flange K, upon which rests the cap or cover $l$, a yoke, $m$, and a screw, $n$, being employed to secure such cover in its place. To this cover I apply a double or automatic safety-valve, the larger valve, $o$, being adjusted at an ascertained pressure to permit the outflow of steam from within the vessel H, the smaller valve, $o'$, being adjusted to permit the inflow of steam into vessel H from the vessel G. An ejecting-pipe, $s$, is attached to the base of the vessel H, which, when the vessel is seated in its position in the vessel G, passes through the bottom thereof, a shoulder, $r$, properly packed, resting upon the bottom of vessel G, a clamping-nut, $t$, being applied to the pipe $s$, where it projects outside of the vessel G, as a means of securing it in place and preventing any leakage. A screw-cap, $s'$, may be used to close the pipe $s$.

The superheated steam is taken from the expansion-chamber F and inducted into the vessel G by means of pipe $m'$, which is provided with cut-off valve $m^2$. A cut-off pipe, I, having valve J, is attached to pipe $f$ between the superheater D and expansion-chamber F, and is connected to the drier A, so that the steam may be passed through the superheater without entering the digester G H.

To the vessel G, I attach an exhaust or vacuum chamber, M, the connecting-pipe $v$ being provided with a cut-off valve $v'$. This exhaust-chamber has an opening, $w$, through which the heating medium is introduced and fired, it afterward being closed by means of any flat plate. A vacuum-gage, N, and an air-inlet pipe, O, provided with valve $o'$, are also attached to this vacuum-chamber for the purpose of indicating the degree of vacuum obtained and for releasing it when desired. The air might be exhausted from the digester G H by means of an air-pump; but I prefer the apparatus as shown.

The operation of my invention is substantially as follows: The meat to be dissolved is, after suitable preparation, introduced into the vessel H, which is then securely closed and inserted in its position inside the vessel G, whose mouth is then securely closed by the means previously described. Prior to charging the digesting apparatus with meat steam has been introduced from the main supply-boiler to the drier A, from thence taken to the superheater D and expansion-chamber F, and thereby brought to the proper degree of heat preliminary to being admitted into the digesting apparatus. The valve $m^2$ in pipe $m'$ now being opened, the superheated steam flows into the vessel G surrounding the inner vessel, H. The full pressure need not be admitted until both vessels are heated sufficiently to prevent any condensation of the steam. The proper degree of pressure of the superheated steam is now applied, when the inlet-valve $o'$ in the cover $l$ of vessel H opens and permits the superheated steam to enter and act upon the meat contained in vessel H.

Prior to admitting the superheated steam to the vessels G H a vacuum may be, if necessary, formed therein by means of the vacuum-chamber M, the air being exhausted therefrom by means of an alcohol or spirit flame, the opening of the valve $v'$ allowing the air to be drawn from vessel G to the vacuum chamber, the operation being repeated until the desired degree of vacuum is obtained. During the action of the superheated steam upon the meat the pressure upon the interior of both vessels is equal. When the period of time allotted for the process of dissolving the meat has elapsed the flow of superheated steam is cut off by means of the valve $m^2$. At this stage of proceedings, after the steam-pressure is cut off, the pressure on the inside of the interior vessel, H, at once closes the inlet-valve $o'$ and the steam in the vessel G at once commences to condense; but the action of dissolving continues in the vessel H, and, owing to the great heat contained in the mass of matter therein, there is a tendency to turn the moisture and water in the bottom of the vessel into steam. This causes an increased pressure, which might burst the vessel H; but any such pressure beyond a fixed degree is at once released by the opening of the outlet-valve $o$, allowing the surplus steam to enter vessel G, where it condenses. The process now being completed, the juices, &c., extracted from the meat and the water accumulated in the bottom of vessel H are drawn therefrom by means of the pipe $s$. This done the vessel H is removed and the contents thereof removed. A waste-cock, $y$, is attached to the base of the vessel G, by means of which any water condensed from the steam can be removed from time to time.

The final manipulation of the matter dissolved from the meats and its separation from the water commingled therewith is a matter of evaporation, not forming a part of the operation of the apparatus herein described.

The details of the properties of the product dissolved from meats by my process and a description of its nature and components will form part of a separate application for a patent for such product, and for such reason is omitted from this specification.

It is obvious that any number of digesters can be supplied from one device or apparatus for superheating steam.

What I claim as my invention, and desire to secure by Letters Patent, is—

1. An apparatus for dissolving and digesting meat, consisting essentially of two vessels hermetically sealed, one suspended wholly within the other and carrying the charge of meat to be acted upon by superheated steam, and means whereby the steam is first introduced directly into the outer vessel at a defined pressure, and from thence, minus condensation, through a pressure-valve into the inner vessel, all substantially as and for the purposes as herein shown and set forth.

2. The dissolving and digesting apparatus consisting of vessel G and interior vessel, H, provided with compensating-valves $o$ and $o'$, inlet steam-pipe $m'$, and discharge-pipe $s$, both vessels capable of being hermetically closed, all substantially as and for the purposes as herein shown and described.

3. The combination of vessels G and H, arranged to be hermetically closed and provided with inlet-pipe $m'$, discharge-pipe $s$, and automatic compensating-valves $o$ and $o'$, and the vacuum-chamber M, all arranged, applied, and operating as and for the purposes substantially as herein shown and set forth.

4. The combination of the steam-drier A and heater B, superheater D, expansion-chamber F, and digesting apparatus G H, all arranged, applied, and operating substantially as and for the purposes as herein shown and set forth.

SAMUEL W. BOWNE.

Witnesses:
ALFRED B. SCOTT,
A. L. MUNSON.